UNITED STATES PATENT OFFICE.

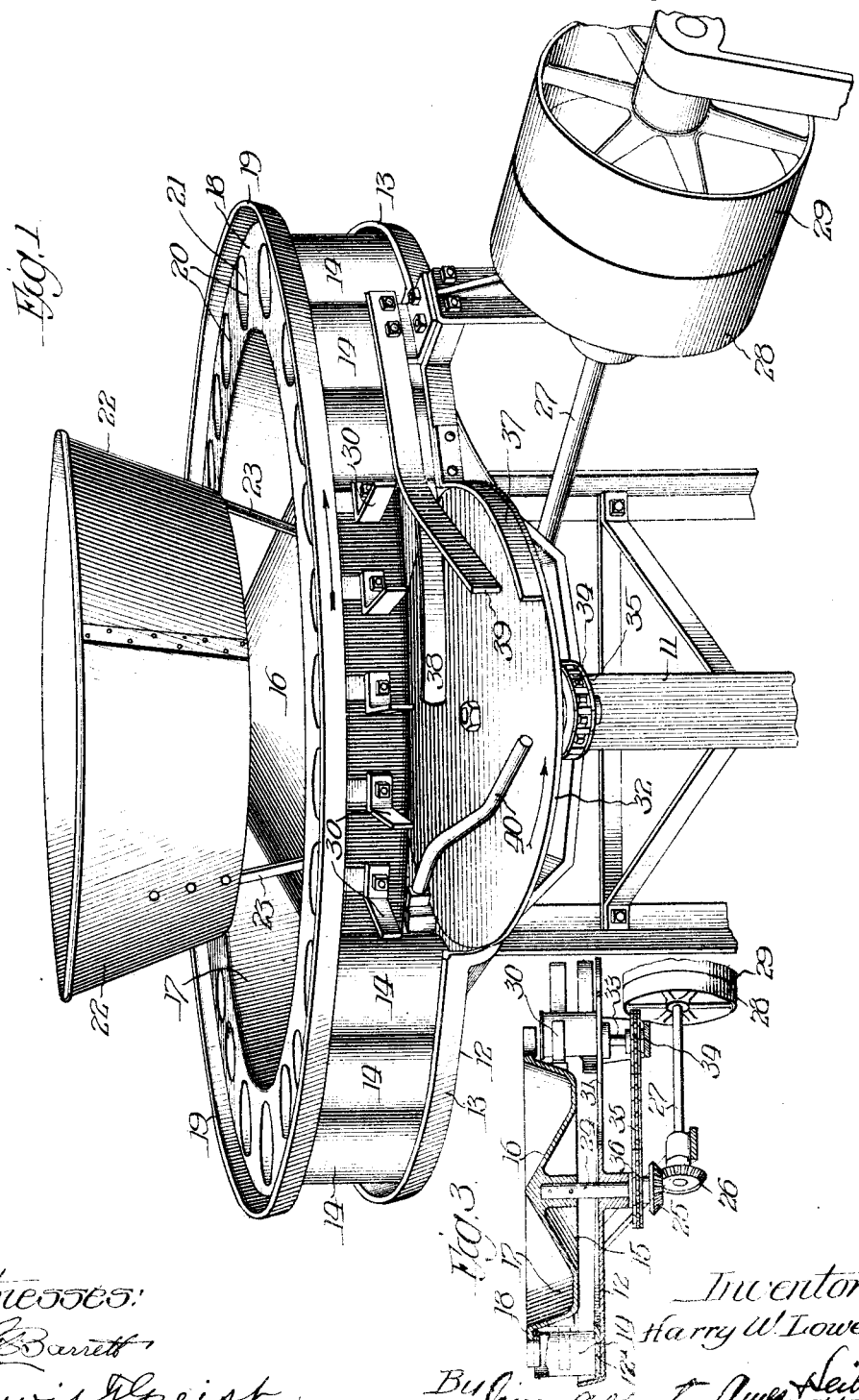

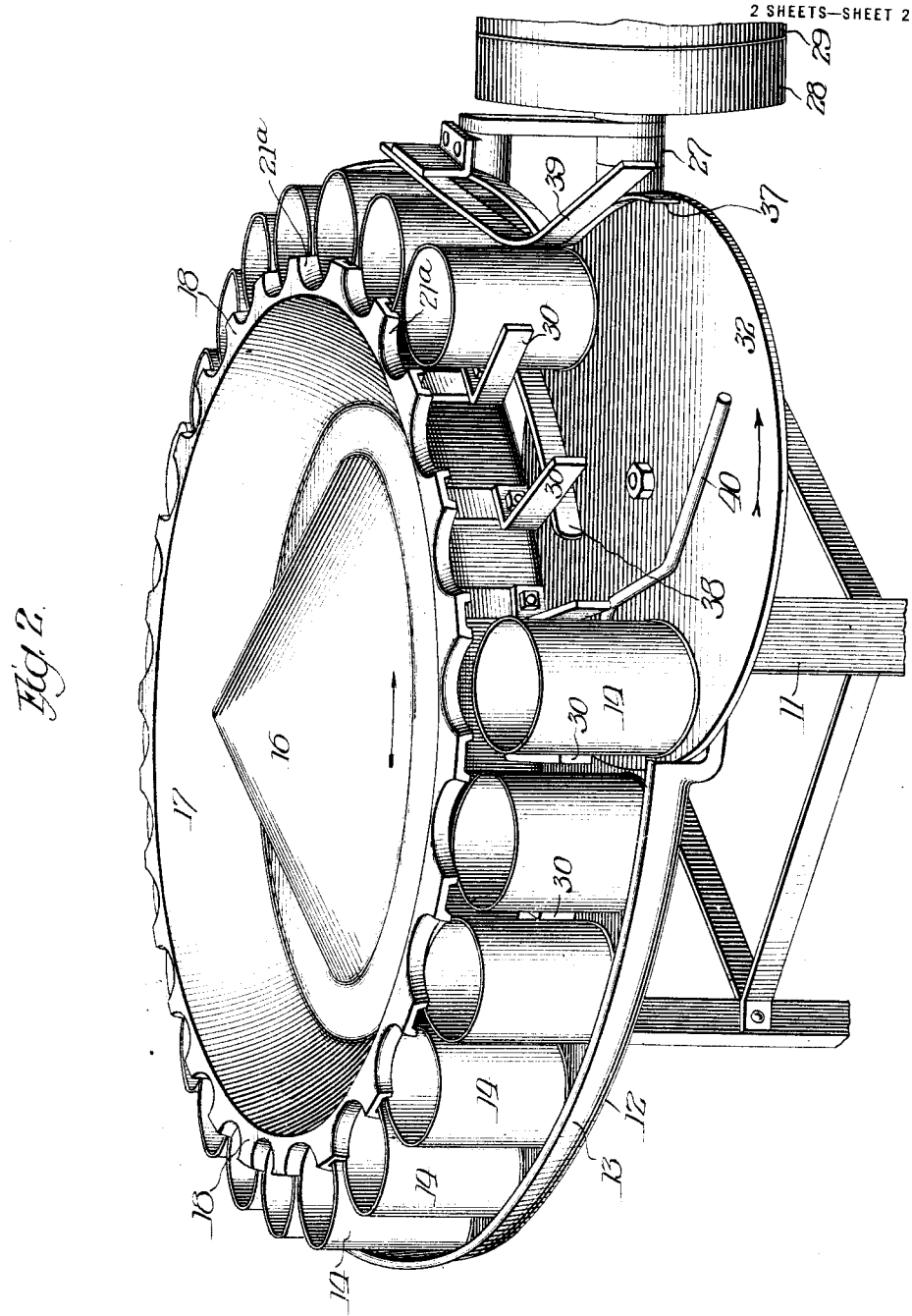

HARRY W. LOWE, OF FLORENCE, NEBRASKA.

HAND-PACK FILLING-MACHINE.

1,200,377.   Specification of Letters Patent.   Patented Oct. 3, 1916.

Application filed April 13, 1914. Serial No. 831,655.

*To all whom it may concern:*

Be it known that I, HARRY W. LOWE, a citizen of the United States, residing at Florence, in the county of Douglas and State of Nebraska, have invented certain new and useful Improvements in Hand-Pack Filling-Machines, of which the following is a specification.

The invention has for its object the provision of efficient and sanitary means for employment in connection with the filling of fruits, vegetables and similar cooked food products into cans whereby the hand work of the operators is greatly facilitated and the uniformity of the packaging is promoted. This general object is attained by means of a moving can carrier traveling preferably in an orbital path within which is arranged a central container from which the operators standing or sitting about the machine transfer the cooked material to the cans, the empty cans being fed to and the filled cans discharged from the machine by a simple device serving in the dual capacity of feed and discharge, means being also provided to prevent jamming or crushing of the cans as they enter the machine.

In the accompanying drawings and in the description based thereon are set forth preferred and modified embodiments of the invention. As, however, the invention is capable of embodiment in other and varied constructional forms the drawing and description are to be construed in an illustrative and not in an unnecessarily limiting sense.

In the drawings: Figure 1 is a view in perspective of a machine embodying the invention; Fig. 2 is a similar view of a slightly modified form of machine; and Fig. 3 is a fragmentary sectional view illustrating the driving connections which are common to both forms of the machine.

Upon a suitable supporting frame 11 is mounted a table 12 having a marginal flange 13 which latter serves to confine the cans 14 within an annular path about the margin of the table. Centrally of the table is mounted a rotary bowl 15 the inner portion of which extends upwardly as a cone 16 so as to provide within the bowl an annular trough 17 about the cone 16. The bowl is provided with a horizontally extending rim 18, which in the construction shown in Fig. 1, has an upwardly extending flange 19, the rim 18 being provided at regular spaced intervals with openings 20 each bounded by a downwardly extending flange 21, the external diameter of which is slightly less than the interior diameter of the cans 14, the flange 21 being adapted to enter within the open top of a can. Surmounting the bowl 15 is a hopper 22 supported upon standards 23 in spaced relation above and concentrically of the conical projection 16. By means of this hopper the food products are introduced to the bowl and are caused to flow beneath the lower edge of the same into the annular channel 17.

The bowl 15 is shown as mounted upon a vertical shaft 24 provided with a bevel gear 25 in mesh with a similar gear 26 upon the drive shaft 27 which latter is driven from any suitable source of power by means of the fast and loose pulleys 28, 29.

The bowl 15 is provided about its periphery with radially extending arms 30 arranged at spaced intervals corresponding to the distance separating the discharge openings 20, these arms 30 extending above the marginal portion of the table 12 and serving each to engage the can and carry the same around the table with the bowl and in register with the opening 20. The table 12 is cut away upon one side at 31 to provide a substantially semicircular opening within which is mounted a feed and discharge disk 32, the said disk being carried upon the shaft 33 provided with a sprocket 34 driven by means of a chain 35 from a sprocket 36 upon the shaft 24 whereby the disk 32 is caused to revolve in an orbit overlapping the orbit of the bowl, one side of the disk moving outwardly away from the bowl and the other side inwardly toward the same.

The inwardly moving or feed portion of the disk is provided with a marginal guard 37 fixed upon the flange 13 of the table 12 and inner and outer spring deflecting arms or rods 38 and 39 are mounted upon the table and extend over the feed portion of the disk, while upon the opposite or discharge side of the disk a deflecting arm or rod 40 is fixedly mounted upon the table 12 and projects above the outwardly moving side of the disk.

Tomatoes or similar fruit being supplied to the hopper 22 flow beneath the lower edge of the same and maintain the trough 17 substantially full of the juice saturated material. Cans are supplied by hand or in any suitable manner to the exterior edge of the disk 32 and by the movement of the same are carried inwardly toward the bowl and between the arms 38 and 39. They are deflected by the arms 38 toward the margin of the disk and each is engaged in turn by one of the carrying arms 30 by which it is swept from the disk on to the marginal portion of the table beneath and in register with one of the discharge openings 20. In its transfer from the disk to the table the can bears outwardly against the spring arm 39 which precludes any possibility of the can being crushed between one of the carrier arms 30 and the flange 13 at the entrance to the table. That portion of the table upon the side where the cans enter and leave the same is not in the same plane as the remainder of the table but is slightly lower. This is accomplished by a plate 12ª for the cans to rest on which fits in the bottom of the table 12 and which decreases in thickness toward the point of entrance and exit of the cans (as clearly appears in Fig. 3), so that at the entry and discharge the space separating the table and the overhanging rim of the bowl is somewhat greater and the cans are thus permitted to pass beneath the depending marginal flange 21 of the opening 20 and as they move forwardly around the table upon the gradually ascending path formed by this plate 12ª each can rises so as to cause the flange 21 to enter within its top.

An operator standing at the right hand side of the table by means of her hands draws the juice saturated tomatoes or other fruit over the edge of the trough upon the rim and into each succeeding filling opening 20 so as to partially fill each of the cans presented in turn while another operator at the left hand side of the machine completes the filling of each can and is charged with the duty of seeing that each can is uniformly filled. This makes one person responsible for the pack and insures a degree of uniformity not possible where several operators are working independently as under the old hand pack method of filling. As the cans leave the second operator and approach the discharge side of the disk their path descends and each in turn drops out of engagement with the flange 21 of the opening with which it has been in register and by the time the can is carried on to the outwardly moving edge of the disk 32 it is out of engagement with such flange and passing upon the disk is carried outwardly away from the bowl and deflected by the arm 40 on to any suitable discharge carrier or to a position to be removed by hand.

In Fig. 2 is shown a form of machine suited to the packing of select fruits in which a predetermined number of whole fruit is placed in each can. This form of construction is in many respects identical with that previously described. However, the hopper 22 is omitted and the rim of the bowl is cut away upon the circular line so as to omit the outer flange 19 and the outer half of the boundaries of the discharge openings, thus leaving the upper portion of each can entirely exposed and merely engaging the inner portion of the can rim by means of the semicircular flanges 21ª. With this machine the first operator endeavors to place in each can a predetermined number of tomatoes or the like and the second operator is charged with the duty of seeing that each can contains the proper number and also to complete the filling of the same with juice. The cans are fed into and discharged from the machine in the same manner as previously described.

I claim:

1. In a filling machine, the combination of a bowl having at the top a marginal rim, can positioning and carrying means mounted to move the cans with their upper open ends adjacent the bowl rim, and can feeding and discharge means for supplying empty cans and removing filled cans, substantially as described.

2. In a filling machine, the combination of a bowl having at the top a marginal substantially horizontal rim provided with spaced discharge openings, can positioning and carrying means arranged to move the cans with their upper open ends in register with the discharge openings in the rim, and can feeding and discharge means for supplying empty cans and removing filled cans, substantially as described.

3. In a filling machine, the combination of a rotary bowl having at the top a marginal substantially horizontal rim provided with spaced discharge openings bounded by downwardly extending flanges, can positioning and carrying means arranged to move the cans with their upper open ends in register with the discharge openings and engaged by the flanges of the same, and can feeding and discharge means for supplying empty cans and removing filled cans, substantially as described.

4. In a filling machine, the combination of a rotary bowl having at the top a marginal substantially horizontal rim provided with spaced discharge openings, can positioning and carrying means revolving with the bowl and arranged to move the cans with their upper open ends in register with the openings in the rim, and can feeding and discharge means for supplying empty cans and removing filled cans, substantially as described.

5. In a filling machine, the combination of a rotary bowl having at the top a marginal substantially horizontal rim provided with spaced discharge openings bounded by downwardly extending flanges, can positioning and carrying means mounted on the bowl and arranged to move the cans with their upper open ends in register with the openings and engaged by flanges of the same, and can feeding and discharge means for supplying empty cans and removing filled cans, substantially as described.

6. In a filling machine, the combination of a rotary bowl having a central conical projection surrounded by a trough, and having at the top a marginal substantially horizontal rim provided with spaced discharge openings, can positioning and carrying means revolving with the bowl and arranged to move the cans with their upper open ends in register with the openings in the rim, and can feeding and discharge means for supplying empty cans and removing filled cans, substantially as described.

7. In a filling machine, the combination of a rotary bowl having a central conical projection surrounded by a trough and having at the top a marginal substantially horizontal rim provided with spaced discharge openings bounded by downwardly extending flanges, can positioning and carrying means mounted on the bowl and arranged to move the cans with their upper open ends in register with the openings and engaged by flanges of the same, and can feeding and discharge means for supplying empty cans and removing filled cans, substantially as described.

8. In a filling machine, a reservoir having at the top a marginal rim provided with discharge openings; means to move the cans to and from the reservoir, and means to bring the mouths of the cans adjacent and into register with the discharge openings, substantially as described.

9. In a filling machine, a reservoir having at the top a marginal rim with discharge openings therein bounded by downwardly extending flanges, means to move the cans to and from the reservoir, and means to bring the open ends of the cans adjacent and in register with the discharge openings with the flanges inside the cans, substantially as described.

10. In a filling machine, a bowl having at the top a marginal rim with discharge openings therein bounded by downwardly extending flanges, means to move the cans along the track with their open ends adjacent the marginal rim of the bowl, and means to bring the open ends of the cans into and out of register with the flanged discharge openings, substantially as described.

11. In a filling machine, a bowl having sloping sides, a marginal rim at the top of the bowl, discharge openings in the rim, and means for bringing the cans into and out of register with said discharge openings, substantially as described.

12. In a filling machine, a bowl having sloping sides, a marginal rim at the top of the bowl, discharge openings in the rim bounded by downwardly extending flanges, and means for bringing the cans into and out of register with said flange-bounded discharge openings.

13. In a filling machine, a rotary substantially circular fruit holder having a peripheral edge, the space above said edge being unobstructed so that the fruit is accessible to an operator adjacent the machine, and so that the operator can remove fruit from the holder adjacent the peripheral edge of the holder, in combination with means for moving a series of cans along with and adjacent said peripheral edge as the holder rotates, whereby the operator can readily transfer the fruit from the holder to the cans.

14. In a filling machine a rotary substantially circular fruit holding table having a peripheral edge, the space above said edge being unobstructed so that the fruit is accessible to an operator adjacent the machine, and so that the operator can remove fruit from the holder adjacent the peripheral edge of the holder, in combination with means for moving a series of cans along with and adjacent said peripheral edge as the holder rotates, whereby the operator can readily transfer the fruit from the holder to the cans.

15. In a filling machine a rotary substantially circular fruit holder having a peripheral edge, the space above said edge being unobstructed so that the fruit is accessible to an operator adjacent the machine, and so that the operator can remove fruit from the holder adjacent the peripheral edge of the holder, in combination with means for moving a series of cans along with and adjacent said peripheral edge as the holder rotates, whereby the operator can readily transfer the fruit from the holder to the cans, said holder being provided with guide means for directing the fruit into the cans.

16. In a filling machine a rotary substantially circular fruit holder having a peripheral edge, the space above said edge being unobstructed so that the fruit is accessible to an operator adjacent the machine, and so that the operator can remove fruit from the holder adjacent the peripheral edge of the holder, in combination with means for moving a series of cans along with and adjacent said peripheral edge as the holder rotates, whereby the operator can readily transfer the fruit from the holder to the cans, said holder being provided with guide passages for directing the fruit into the cans.

17. In a filling machine a fruit holder having a peripheral edge, the space above said edge being unobstructed so that the fruit is accessible to an operator adjacent the machine and so that the operator can remove fruit from the holder adjacent the peripheral edge of the holder, means for moving said holder and means for moving a series of cans along with and adjacent said peripheral edge as the holder moves whereby the operator can readily transfer the fruit from the holder to the cans.

In testimony whereof I have hereunto signed my name in the presence of two subscribing witnesses.

HARRY W. LOWE.

Witnesses:
 DANIEL G. TRENCH,
 LELAND A. BABCOCK.